Oct. 11, 1966      F. ANGST      3,277,753
LATHE TOOL HOLDER
Filed Oct. 5, 1964
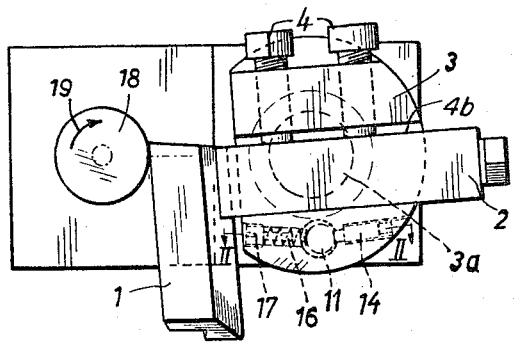
Fig. 1
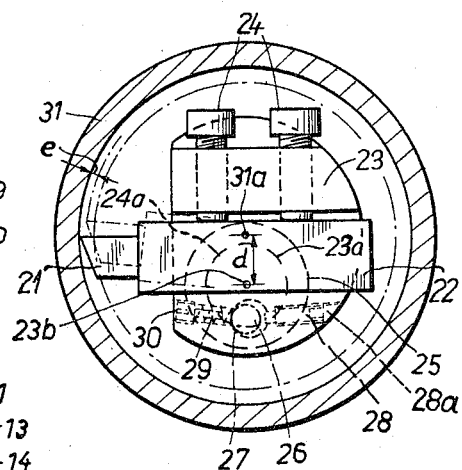
Fig. 5
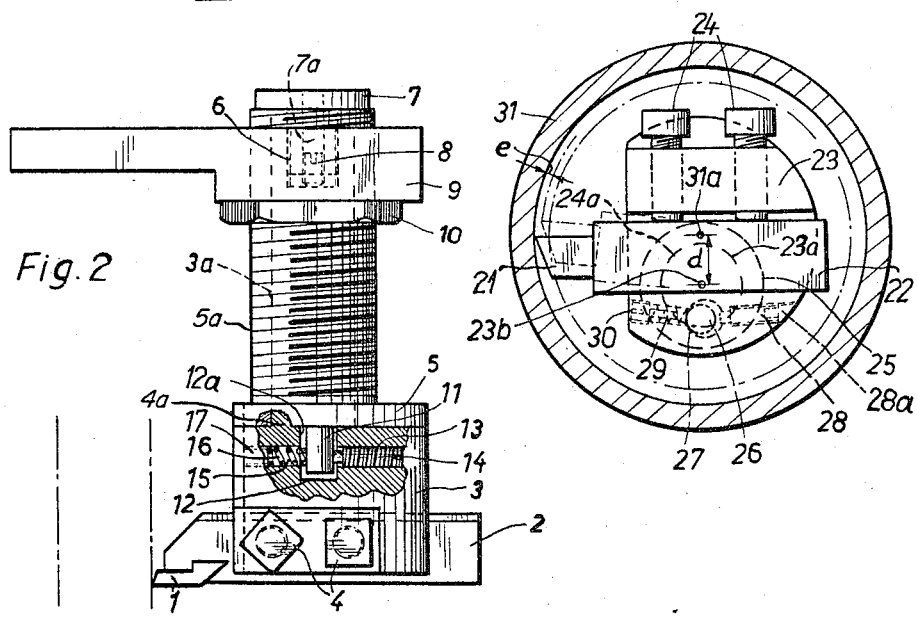
Fig. 2
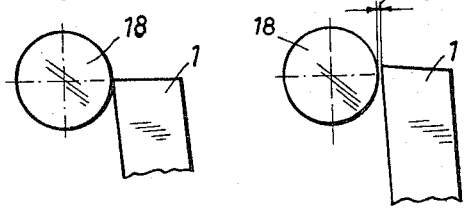
Fig. 3     Fig. 4
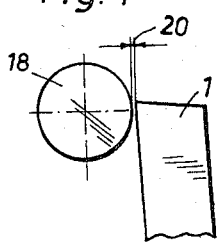
Inventor:
Fritz Angst
by: Edwin E. Greigg

United States Patent Office

3,277,753
Patented Oct. 11, 1966

3,277,753
LATHE TOOL HOLDER
Fritz Angst, Wattwil, St. Gall, Switzerland
Filed Oct. 5, 1964, Ser. No. 401,405
Claims priority, application Switzerland, Oct. 3, 1963, 12,168/63; Sept. 15, 1964, 11,974/64
4 Claims. (Cl. 82—36)

This invention relates to lathe tool holders and has as its object to provide a tool holder construction by means of which it is avoided that the turning tool upon its return stroke at the end of a turning operation produces a flute or groove in the machined surface. The lathe tool holder according to the present invention comprises a fixed bearing member, a lathe tool carrier rotatably mounted on said bearing member for effecting a limited angular movement relatively thereto to move the tool into and out of work engaging position, spring means acting on said tool carrier and tending to move the carrier out of work engaging position, and stop means for holding the tool in work engaging position during a turning operation.

Preferably, the limitation of the rotary motion of the lathe tool holder to out of work engaging position is obtained by means of an adjustable stop member, and regulating means are provided for adjusting the tension of the spring means acting on the tool carrier.

A further object of the invention is the provision of a lathe tool holder which enables to automatically lift the tool off the machined surface for a substantial amount, both for external and internal turning operations. To this end, according to the invention, the axis of rotation of the tool carrier is offset in such direction with respect to the plane through the axis of rotation of the workpiece and the point of engagement of the tool on the workpiece that the cutting edge of the tool when said tool carrier moves out of work engaging position, will move away from the machined surface of the workpiece.

The present invention will now be described in more detail with reference to the accompanying drawings illustrating, by way of example, two embodiments of the invention, and in which:

FIGURE 1 is a front view of a lathe tool holder according to the first embodiment, FIGURE 2 is a plan view partly drawn in section along the line II—II of FIGURE 1, FIGURES 3 and 4 diagrammatically show two different positions of the lathe tool relatively to the workpiece, FIGURE 5 is a front view of the second embodiment, showing a lathe tool machining an internal surface.

Referring to the embodiment shown in FIGURES 1 and 2 the lathe tool comprises an insert 1 and an arm 2 which is secured to a tool carrier 3 by means of screws 4 extending into recess 4b. A conventional lathe tool could also be inserted in the carrier 3 in place of the composite tool having members 1 and 2. The carrier 3 is provided with a stud 3a which is rotatably mounted in a circular aperture 4a of a bearing member 5. A threaded pin 6 of a disk 7 is screwed into an axial recess in the free end of the stud 3a and locked in its position by a grub screw 8 screwed into an axial bore 7a of the screw 6, 7 and against the bottom of the recess for this screw for wedging the thread thereof. The screw 6, 7 maintains the tool carrier 3 against axial displacement. The bearing member 5 comprises a threaded sleeve 5a by means of which it is screwed into a threaded bore of a supporting plate 9 and locked therein by a nut 10. The fixed bearing member 5 is provided with an axially extending eccentric pin 11 which enters into a bore 12 of the tool carrier 3 which bore exhibits a somewhat larger diameter than the pin 11. A set screw 14 is screwed into a passage 13 extending transversely to the bore 12, and serves as a stop for the pin 11. A spring 16 is inserted into a transverse passage 15, one end of the spring 16 abutting against the pin 11, while a regulating screw 17 acts against the other end of the spring for adjusting its tension.

In the position shown in FIGURES 1 and 2, before starting a machining operation the spring 16 tends to turn the tool carrier 3 so that the set screw 14 abuts against the pin 11. When now the machining of the workpiece 18 is started and the latter rotates in the direction of the arrow 19, and the cutting edge of the tool 1, 2 engages the workpiece, then the tool carrier 3 is caused to effect a small angular movement in counter-clockwise direction against the influence of the spring 16 to the relative position between cutter 1 and workpiece 18 as shown in FIGURE 3, in which position the cylindrical wall 12a of the bore 12 abuts against the pin 11. The tool carrier 3 remains in this position during the entire machining operation. At the end of the operating stroke the tool carrier 3 moves back to the starting position shown in FIGURES 1 and 4 by the action of the spring 16; in this position the cutting point of the lathe tool 1, 2 is lifted off the surface which has been machined during the turning operation by the minute distance 20, whereby it is avoided that the tool during its return stroke remains in contact with the workpiece and produces a small groove in the machined surface thereof. By the intermediary of the set screw 14 the amplitude of angular movement of the tool holder can be made to conform to the thickness of the cutting.

In the example according to FIGURE 5 the lathe tool comprising an insert 21 and a carrying sleeve 22, is secured in a tool carrier 23 by means of screw 24. The carrier 23 is provided with a stud 23a which is rotatably mounted in an eccentric circular aperture 24a of a stationary bearing member 25. On this bearing member 25 there is eccentrically located an axially directed pin 26 which enters into a somewhat larger bore 27 of the carrier 23.

A set screw 28 is screwed into a passage 28a extending transversely with respect to the bore 27, which serves as an abutment for the pin 26 and for adjusting the extent of angular lifting-off movement of the tool carrier. A spring 29 is inserted in an oppositely extending transverse passage; one end of this spring acts upon the pin 26, while the other end thereof bears against a screw 30 in said transverse passage by means of which the tension of the spring 29 can be regulated.

The holding device according to FIG. 5 serves for turning internal surfaces of a workpiece 31 which is rotatable around an axis of rotation 31a. As it will be readily apparent, the axis of rotation 23b of the stud 23a is offset with respect to the axis of rotation 31a through the distance d. In the position of the lathe tool 21 shown in full lines, this tool occupies an effective position during the turning operation, in which the spring 29 is compressed. At the end of the turning operation when the pressure exerted on the tool by the workpiece ceases, the tool carrier 23 is angularly moved by the action of the spring 29 into the position indicated by dash-dot lines, which position is limited by the set screw 28 and in which position the cutting edge of the lathe tool 21, 22 is lifted off from the machined surface by the distance e. In this manner the tool during its return stroke is prevented from producing a flute in the machined surface.

It is clear, that also in the construction of the lathe tool holder shown in FIGURES 1 and 2, for external turning operations the axis of rotation, about which the tool carrier is mounted so as to be angularly movable to a limited degree, is offset with respect to the plane extending through the axis of rotation of the workpiece and the contact point of the tool on the workpiece, in order that when moving to its inactive position the cutting edge is out of contact with the machined surface of the workpiece and no groove will be produced in the worked surface during the return stroke of the tool. The described devices can be built for right-hand and left-hand latches, i.e. acting upon the lathe tool in clockwise- and counter-clockwise direction.

I claim:

1. A lathe tool holder comprising a stationary bearing member having a circular aperture, means for affixing said bearing member to a support, a tool carrier rotatably disposed adjacent said bearing member, said tool carrier having at least one tool holding recess on the free axial end face thereof, a stud fixedly secured to the opposite axial end face of said carrier and extending through said aperture, means for preventing an axial motion of said stud, a bore extending into said carrier from said opposite face, an eccentric pin secured to said bearing member spaced from said circular aperture and extending parallel to the axis of said stud into said bore, said bore having a diameter greater than that of said pin to permit a rocking motion of limited amplitude of said carrier to permit said tool to assume a work engaging position and a retracted position, and means disposed about said pin to urge said tool out of said work engaging position.

2. A lathe tool holder as defined in claim 1, wherein said means disposed about said pin include two transverse passages inside said carrier and communicating with said bore, an abutment disposed in one of said passages and adapted to engage said pin, said abutment being adjustable in a direction transversal to said pin to vary said amplitude, and a spring disposed in the other of said passages and adapted to exert pressure on said pin causing said abutment to be urged against said pin.

3. A lathe tool holder as defined in claim 1, wherein said means for affixing said bearing member to said support includes a sleeve integral with said bearing member and attached to said support, said stud being rotatably disposed within and with respect to said sleeve.

4. A lathe tool holder as defined in claim 3, wherein said sleeve has an open end and said stud has a free end adjacent said open end, said means for preventing an axial motion of said stud includes means secured to said free end of said stud and extending transversally beyond the open end of said sleeve.

References Cited by the Examiner
UNITED STATES PATENTS

| | | |
|---|---|---|
| 2,211,321 | 8/1940 | Eipper. |
| 2,525,216 | 10/1950 | Garrand _____ 82—37 |
| 3,199,387 | 8/1965 | Garrett. |

WILLIAM W. DYER, JR., *Primary Examiner.*

L. VLACHOS, *Assistant Examiner.*